US011434673B2

(12) United States Patent
Poppe et al.

(10) Patent No.: US 11,434,673 B2
(45) Date of Patent: Sep. 6, 2022

(54) AIRCRAFT DOOR LOCKING SYSTEM AND AIRCRAFT DOOR ARRANGEMENT

(71) Applicant: Airbus Operations GmbH, Hamburg (DE)

(72) Inventors: Andreas Poppe, Hamburg (DE); Uwe Papenroth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/661,583

(22) Filed: Oct. 23, 2019

(65) Prior Publication Data

US 2020/0131815 A1 Apr. 30, 2020

(30) Foreign Application Priority Data

Oct. 30, 2018 (DE) .......................... 102018127106.9

(51) Int. Cl.
*E05C 3/04* (2006.01)
*B64C 1/14* (2006.01)
*E05C 3/00* (2006.01)

(52) U.S. Cl.
CPC ............ *E05C 3/046* (2013.01); *B64C 1/1407* (2013.01); *E05C 3/004* (2013.01)

(58) Field of Classification Search
CPC ........ E05C 3/046; E05C 3/004; E05C 9/1858; E05C 19/009; E05C 19/04; B64C 1/1407;
(Continued)

(56) References Cited

U.S. PATENT DOCUMENTS 1,799,503 A * 4/1931 Devereaux .............. E05B 85/22
292/336.5
2,750,217 A * 6/1956 Landholt ............... E05C 19/145
292/DIG. 31
(Continued)

FOREIGN PATENT DOCUMENTS

DE 102009014528 A1 7/2010
DE 102010013715 A1 * 10/2011 ........... B64C 1/1407
(Continued)

OTHER PUBLICATIONS

French Search Report from corresponding French Patent Application No. 1911897 dated Nov. 17, 2021.
German Search Report; priority document.

*Primary Examiner* — Kristina R Fulton
*Assistant Examiner* — Tal Saif
(74) *Attorney, Agent, or Firm* — Greer, Burns & Crain, Ltd.

(57) ABSTRACT

An aircraft door locking system comprises a first locking element fastenable to a first element of an aircraft door arrangement rotatable about a rotation axis and having a receiving opening and a bearing shell. A second locking element is fastenable to a door arrangement second element and comprises a locking bolt. In a release state, the locking bolt is insertable through the receiving opening and, by a rotation of the first locking element about the rotation axis in a locking direction, is positionable in the bearing shell to effect the locking state. A torque-generating device is configured, in the locking state, to generate a torque opposing a rotation of the first locking element about the rotation axis in a release direction opposite to the locking direction if a force directed substantially perpendicular to the rotation axis is exerted on the bearing shell and/or on the locking bolt.

18 Claims, 5 Drawing Sheets

(58) Field of Classification Search
CPC ........... Y10T 292/1039; Y10T 292/104; Y10T 292/1041; Y10T 292/1077; Y10T 292/1078; Y10T 292/68; Y10T 292/0811; Y10T 292/0815; Y10T 292/0824; E05B 83/24; E05B 17/0012; Y10S 292/53; Y10S 292/64

See application file for complete search history.

(56) References Cited

U.S. PATENT DOCUMENTS

| | | | | |
|---|---|---|---|---|
| 3,254,517 | A * | 6/1966 | Wheeler | E05B 65/0811 |
| | | | | 292/195 |
| 3,791,073 | A * | 2/1974 | Baker | B64C 1/1407 |
| | | | | 49/40 |
| 4,473,201 | A * | 9/1984 | Barnes | B64C 1/1415 |
| | | | | 292/216 |
| 4,720,065 | A * | 1/1988 | Hamatani | B64C 1/143 |
| | | | | 244/905 |
| 5,251,851 | A * | 10/1993 | Herrmann | B64C 1/143 |
| | | | | 49/141 |
| 5,305,969 | A * | 4/1994 | Odell | B64C 1/1407 |
| | | | | 292/259 R |
| 6,457,675 | B1 * | 10/2002 | Plude | B64C 1/1415 |
| | | | | 49/276 |
| 8,919,698 | B2 * | 12/2014 | Kim | E05D 3/12 |
| | | | | 244/129.5 |
| 2011/0049299 | A1 * | 3/2011 | Gowing | B64C 1/1407 |
| | | | | 244/129.5 |
| 2011/0241359 | A1 | 10/2011 | Trunk | |
| 2017/0129585 | A1 * | 5/2017 | Erben | E05B 17/2034 |

FOREIGN PATENT DOCUMENTS

| | | | | |
|---|---|---|---|---|
| EP | 1270405 | A2 | 1/2003 | |
| EP | 3168138 | A1 | 5/2017 | |
| FR | 2678314 | A1 * | 12/1992 | ............ E05B 81/22 |
| FR | 2772338 | A1 * | 6/1999 | ........... B64C 1/1407 |
| JP | 3857492 | B2 * | 12/2006 | ............ E05B 81/66 |
| WO | 8401761 | A1 | 5/1984 | |
| WO | WO-2013172804 | A1 * | 11/2013 | ........... B64C 1/1407 |

* cited by examiner

AIRCRAFT DOOR LOCKING SYSTEM AND AIRCRAFT DOOR ARRANGEMENT

CROSS-REFERENCES TO RELATED APPLICATIONS

This application claims the benefit of the German patent application No. 102018127106.9 filed on Oct. 30, 2018, the entire disclosures of which are incorporated herein by way of reference.

FIELD OF THE INVENTION

The present invention relaters to an aircraft door locking system and to an aircraft door arrangement provided with such a locking system.

BACKGROUND OF THE INVENTION

An aircraft door arrangement suitable for use in modern commercial aircraft has to meet a multiplicity of requirements and licensing regulations. For example, the aircraft door arrangement has to have a locking system which secures the aircraft door in its closed position in the flight mode of an aircraft provided with the aircraft door arrangement. Aircraft door arrangements currently customary are conventionally provided with kinematics which, during the placing of a door opening, formed in the aircraft fuselage, by a door, the door which is already positioned in the doorframe is moved inward by approx. 2 to 3 mm and downward by approx. 50-60 mm relative to a doorframe until the door has reached a locking position. The door arranged in its locking position can then be secured in its closed position by activation of the locking system.

Conversely, in order to open the door, first of all the locking system is deactivated and is then moved inward by 2-3 mm and upwards by approx. 50-60 mm until the door has reached a position in which the door can be moved further in such a manner that it opens up the door opening. The door opening can be opened up, for example, by pivoting of the door about a pivot axis, but also by displacing the door parallel to the aircraft fuselage. Both the pivoting movement and the displacement movement of the door conventionally have a movement component which is directed outwards relative to the doorframe, as a result of which it is prevented that the door comes, during the opening, into contact with a region of the aircraft environment surrounding the door opening.

DE 10 2009 014 528 A1 discloses an electromechanical blocking device for a door lock on a cabin door in an aircraft.

SUMMARY OF THE INVENTION

The present invention is directed towards an object of providing an aircraft door locking system which is particularly secure but is at the same time constructed in a simple and space-saving manner. Furthermore, the invention is directed towards the object of specifying an aircraft door arrangement provided with such a locking system.

An aircraft door locking system comprises a first locking element which is fastenable to a first element of an aircraft door arrangement so as to be rotatable about a first axis of rotation and has a receiving opening and a bearing shell. The first locking element is preferably fastenable to the first element of the aircraft door arrangement in such a manner that, although the locking element is rotatable relative to the first element of the aircraft door arrangement about the first axis of rotation, it cannot carry out any further movements relative to the first element of the aircraft door arrangement.

Furthermore, the aircraft door locking system comprises a second locking element which is fastenable to a second element of the aircraft door arrangement and comprises a locking bolt. The locking bolt preferably extends substantially parallel to the first axis of rotation of the first locking element or has at least one portion extending substantially parallel to the first axis of rotation of the first locking element.

The first element of the aircraft door arrangement can be, for example, an aircraft door while the second element of the aircraft door arrangement can be in the form of a doorframe. However, a reverse configuration is likewise conceivable, i.e., the first locking element of the aircraft door locking system can also be fastenable to a first element of the aircraft door arrangement, the first element being in the form of a doorframe, while the locking bolt of the aircraft door locking system can also be fastenable to a second element of the aircraft door arrangement, the second element being in the form of a door. In such a case, only a corresponding adaptation of the orientation of the first locking element relative to the corresponding first element of the aircraft door arrangement is required.

In a release state of the aircraft door locking system, the locking bolt of the second locking element is insertable through the receiving opening of the first locking element by means of a translatory relative movement of the first and second locking element in a plane perpendicular to the first axis of rotation of the first locking element. In principle, the translatory relative movement of the two locking elements can be realized by a movement, in particular a convergence of the two locking elements. As an alternative thereto, it is, however, also conceivable for only one of the two locking elements to move in the direction of the other locking element while the other locking element remains fixed in position.

In the state of the aircraft door locking system mounted in an aircraft door arrangement, the locking bolt of the second locking element is inserted through the receiving opening of the first locking element preferably by means of a relative movement of the two elements of the aircraft door arrangement, for example by a convergence of the aircraft door, which is movable relative to the doorframe, with the positionally fixed doorframe during a movement of the aircraft door from an open position into a closed position. Accordingly, the two locking elements of the aircraft door locking system are preferably fastenable to the two elements of the aircraft door arrangement in such a manner that, when the two elements of the aircraft door arrangement converge, the locking bolt of the second locking element is aligned with the receiving opening of the first locking element in such a manner that the locking bolt can be inserted unobstructed into the receiving opening of the first locking element.

Furthermore, the locking bolt is positionable in the bearing shell of the first locking element by means of a rotation, following the insertion of the locking bolt through the receiving opening, of the first locking element about the first axis of rotation in a locking direction, in order to transfer the aircraft door locking system into its locking state. If the aircraft door locking system is in its locking state, the interaction of the locking bolt formed on the second locking element with the bearing shell of the first locking element prevents a separation of the two locking elements and consequently of the two elements of the aircraft door arrangement.

Finally, the aircraft door locking system comprises a torque-generating device which is configured in order, in the locking state of the aircraft door locking system, to generate a torque which opposes a rotation of the first locking element about the first axis of rotation in the direction of a release direction opposite to the locking direction if a force directed substantially perpendicular to the first axis of rotation is exerted on the bearing shell of the first locking element and/or on the locking bolt of the second locking element. The force exerted on the bearing shell of the first locking element and/or on the locking bolt of the second locking element can result, for example, from a pressure difference which, in the flight mode of an aircraft provided with the aircraft door locking system, prevails between an ambient pressure and an internal pressure, which is increased in comparison to the ambient pressure, in a pressurized aircraft cabin.

However, the torque-generating device also generates a torque opposed to a rotation of the first locking element about the first axis of rotation in a release direction if a (manual) compressive force is exerted on an aircraft door which is locked to a doorframe by means of the aircraft door locking system. Finally, the torque-generating device is also suitable for generating a torque opposed to a rotation of the first locking element about the first axis of rotation in the release direction if, for example in the event of an emergency landing of an aircraft provided with the aircraft door locking system on water, an increased external pressure acts on an aircraft door which is locked to a doorframe by means of the aircraft door locking system.

Consequently, the torque-generating device is capable of generating an automatic closing moment opposing a release of the aircraft door locking system, as soon as a force acting in an opening direction is exerted on an aircraft door locked to a doorframe by means of the aircraft door locking system. The aircraft door locking system can therefore lock the aircraft door particularly securely to the doorframe. Furthermore, during the transfer of the aircraft door locking system from its release state into its locking state, a relative movement between the aircraft door and the doorframe in the direction of a vertical axis of the aircraft door or of the doorframe can be omitted. Instead, all that is required is for the first locking element to be rotated about the first axis of rotation.

The aircraft door locking system is therefore particularly readily suitable for locking an aircraft door arrangement which is arranged in the region of a lower deck of an aircraft and is therefore subject to particular installation space restrictions in the direction of the vertical axis of the aircraft door or of the doorframe. Furthermore, the aircraft door locking system satisfies all of the requirements imposed on an aircraft door locking system arranged in the region of a passenger cabin. Accordingly, the aircraft door locking system can be used in a particularly advantageous manner for locking an aircraft door arrangement which is installed in a passenger cabin arranged in the region of a lower deck. However, alternative use possibilities of the aircraft door locking system are likewise possible.

In a preferred embodiment of the aircraft door locking system, the first locking element comprises a first limb and a second limb which is connected to the first limb via a connecting piece. The receiving opening of the first locking element can then be formed between a free end of the first limb and a free end of the second limb. The first and the second limb and also the connecting piece are preferably designed to be substantially C-shaped, as viewed in a top view, i.e., the two limbs of the first locking element are preferably each curved in the direction of the receiving opening arranged between the two free ends of the limbs.

The bearing shell of the first locking element is preferably defined by the connecting piece. The shape of the bearing shell of the first locking element is determined here, in particular, by the shape of an inner surface of the connecting piece, on which inner surface the locking bolt of the second locking element lies when the aircraft door locking system is in its locking state. The shape of the inner surface of the connecting piece is therefore preferably adapted to the shape of an outer surface of the locking bolt. If the locking bolt has, for example, a substantially circular cross section, the inner surface of the connecting piece, as viewed in a top view, is preferably substantially in the form of a circular arc segment, in particular in the form of a semi-circular arc.

The first axis of rotation of the first locking element is preferably arranged in the region of the first limb of the first locking element. In particular, the first axis of rotation is arranged in the region of an axle projection of the first limb, the axle projection projecting in the direction of the second limb. The axle projection is preferably designed to be rounded.

Furthermore, a bearing surface can be formed on the first limb, in particular between the first axis of rotation and the free end of the first limb, the bearing surface being configured to receive the locking bolt of the second locking element if, in the state of the door locking system mounted in an aircraft door arrangement, the first and the second element of the aircraft door arrangement take up a defined extreme position. The bearing surface formed in particular on an inner surface of the first limb, the inner surface facing the second limb, is preferably concavely curved and has a shape adapted to the shape of the locking bolt in order to ensure secure receiving of the locking bolt in the bearing surface.

The defined extreme position of the two elements of the aircraft door arrangement is reached on overrunning the locking lug. The door is drawn maximally into the seal here. A further extreme position is reached if the second locking element is at the transition point of the bearing surface and locking lug. The maximum closing moment is produced here. If the second locking element has reached the final position in the bearing shell, the closing moment approaches zero. The connecting line of the axis of rotation of the first locking element and of the axis of the second locking element (roller) is now at right angles to the outer skin of the aircraft. If a pressure difference is now built up (aircraft takes off and gains height), the lock transmits the resulting internal compressive forces in such a manner that the lock remains moment-free or always attempts to reach a moment-free state.

In a preferred embodiment of the aircraft door locking system, the first locking element furthermore comprises a baseplate. In the state of the aircraft door locking system mounted in an aircraft door arrangement, a first surface of the baseplate faces the first element of the aircraft door arrangement while a second surface of the baseplate facing away from the first element of the aircraft door arrangement carries the limbs and the connecting piece.

The baseplate is preferably provided with a first centering opening which extends through the baseplate parallel to the first axis of rotation. The first centering opening is preferably arranged in the region of the center point of a circular arc segment defined by the bearing shell. The first locking element during the installation on the first element of the aircraft door arrangement can be arranged and oriented at a desired position relative to the second locking element in a simple manner with the aid of the first centering opening.

The torque-generating device of the aircraft door locking system preferably comprises a locking projection which is formed on the second limb of the first locking element and projects in the direction of the first limb of the first locking element. The locking projection is configured to interact with the locking bolt of the second locking element if a force directed substantially perpendicular to the first axis of rotation is exerted on the bearing shell of the first locking element and/or on the locking bolt of the second locking element. The interaction of the locking projection with the locking bolt of the second locking element results in the generation of the torque of the torque-generating device, the torque opposing a rotation of the first locking element in the release direction.

The locking projection of the torque-generating device is preferably arranged closer to an apex point of the connecting piece of the first locking element than the first axis of rotation. The torque of the torque-generating device, the torque opposing a rotation of the first locking element in the release direction, is preferably determined by an angle which is defined by a tangent which lies on a region of the locking projection facing the apex point of the connecting piece, and by a straight line which runs perpendicular to the first axis of rotation through the center point of the circular arc segment defined by the bearing shell. The angle can be, for example, between 20 and 40° and in particular approx. 30°. However, in addition to the configuration of the first locking element, the clamping force of the door seal and the amount of the force exerted on the bearing shell and/or on the locking bolt also influence the closing moment applied by the torque-generating device.

The locking bolt of the second locking element can comprise a core connected to a holding element. In particular, the core can be formed integrally with the holding element. The holding element permits secure installation of the second locking element on the second element of the aircraft door arrangement and can comprise a baseplate with corresponding fastening openings for receiving fastening devices, such as, for example, screws, and also a base extending from the baseplate in the direction of the core.

Furthermore, the locking bolt can comprise a roller which is plugged onto the core and is rotatable relative to the core about a second axis of rotation. The second axis of rotation preferably extends substantially parallel to the first axis of rotation. The rotatable roller of the locking bolt facilitates the relative movement of the first and the second locking element during the release or locking of the aircraft door locking system.

In order to facilitate the arrangement and orientation of the second locking element relative to the first locking element during the installation of the second locking element on the second element of the aircraft door arrangement, the second locking element can be provided with a second centering opening. The second centering opening preferably extends through the core of the locking bolt coaxially with respect to the second axis of rotation and is accordingly aligned with the first centering opening of the first locking element, the centering opening being arranged in the region of the center point of the circular arc segment defined by the bearing shell, if the two locking elements are correctly positioned relative to each other during the installation on the two elements of the aircraft door arrangement.

The aircraft door locking system can furthermore comprise a bearing element which is connectable to the first locking element. The bearing element can comprise a bearing plate with corresponding fastening openings for receiving fastening devices, such as, for example, screws, and also a bearing base which extends from the bearing plate in the direction of the first locking element in a state of the bearing element connected to the first locking element. The bearing element is preferably provided with a third centering opening which, when the aircraft door locking system is installed on an aircraft door arrangement, is positionable relative to the first locking element in such a manner that the centering opening is aligned with the first centering opening formed in the baseplate of the first locking element when the bearing element and the first locking element are arranged relative to each other in the desired installation position.

The aircraft door locking system can furthermore comprise a sensor arrangement for sensing an operating state of the aircraft door locking system. The sensor arrangement is preferably configured to sense a position of the first locking element relative to the first element of the aircraft door arrangement. In the state of the aircraft door locking system mounted in an aircraft door arrangement, sensor signals provided by the sensor arrangement can be transmitted to a control unit. The control unit can then determine with reference to the sensor signals whether the aircraft door locking system is locked or released. The control unit can furthermore be connected to a display device displaying the operating state of the aircraft door locking system. The displace device is preferably arranged in a cabin, in particular in a cockpit of an aircraft provided with the aircraft door locking system.

In a preferred embodiment, the aircraft door locking system furthermore comprises a drive system which is configured to rotate the first locking element about the first axis of rotation in order to adjust the aircraft door locking system between its release state and its locking state. The drive system preferably comprises a rotary shaft which extends coaxially with respect to the first axis of rotation and on which the first locking element is mounted for rotation therewith. Furthermore, the drive system can comprise a lever which is likewise connected to the rotary shaft for rotation therewith and is configured to transmit the driving force required for rotating the first locking element about the first axis of rotation to the rotary shaft. The lever can be actuable manually and/or by a suitable mechanical or electric system.

An aircraft door arrangement comprises a first element, a second element and at least one above-described aircraft door locking system. The first locking element of the aircraft door locking system is fastened to the first element while the second locking element of the aircraft door locking system is fastened to the second element.

In a preferred embodiment of the aircraft door arrangement, the first element is in the form of an aircraft door while the second element is in the form of a doorframe. However, a reverse configuration is also conceivable, that is to say, the first element of the aircraft door arrangement can also be in the form of a doorframe while the second element can also be in the form of an aircraft door.

The aircraft door arrangement can comprise a plurality of above-described aircraft door locking systems. The aircraft door locking systems are then preferably arranged distributed along two mutually opposite side edges of the first and the second element. For example, the aircraft door locking system can be arranged distributed along the two longitudinal edges of a doorframe and of an aircraft door.

When an aircraft door arrangement is provided with a plurality of aircraft door locking systems, the drive systems of the aircraft door locking systems are preferably coupled to one another in such a manner that only some of the aircraft door locking systems are driven directly while some of the other aircraft door locking systems are driven indirectly. In particular, the aircraft door arrangement comprises at least one directly driven aircraft door locking system. If the aircraft door locking systems are arranged distributed along a side edge of the aircraft door arrangement, the directly driven aircraft door locking system(s) is/are preferably arranged "lying on the inside," i.e., the directly driven aircraft door locking system(s) is/are flanked by in each case two adjacent aircraft door locking systems.

Furthermore, when an aircraft door arrangement is provided with a plurality of aircraft door locking systems, only some of the aircraft door locking systems are provided with a sensor arrangement. In particular, it is optionally possible to dispense with monitoring aircraft door locking systems which are arranged "lying on the inside" in a drive chain.

BRIEF DESCRIPTION OF THE DRAWINGS

Preferred embodiments of an aircraft door locking system and of an aircraft door arrangement will be explained in more detail below with reference to the attached schematic figures, of which

DETAILED DESCRIPTION OF THE PREFERRED EMBODIMENTS

Figure 1:
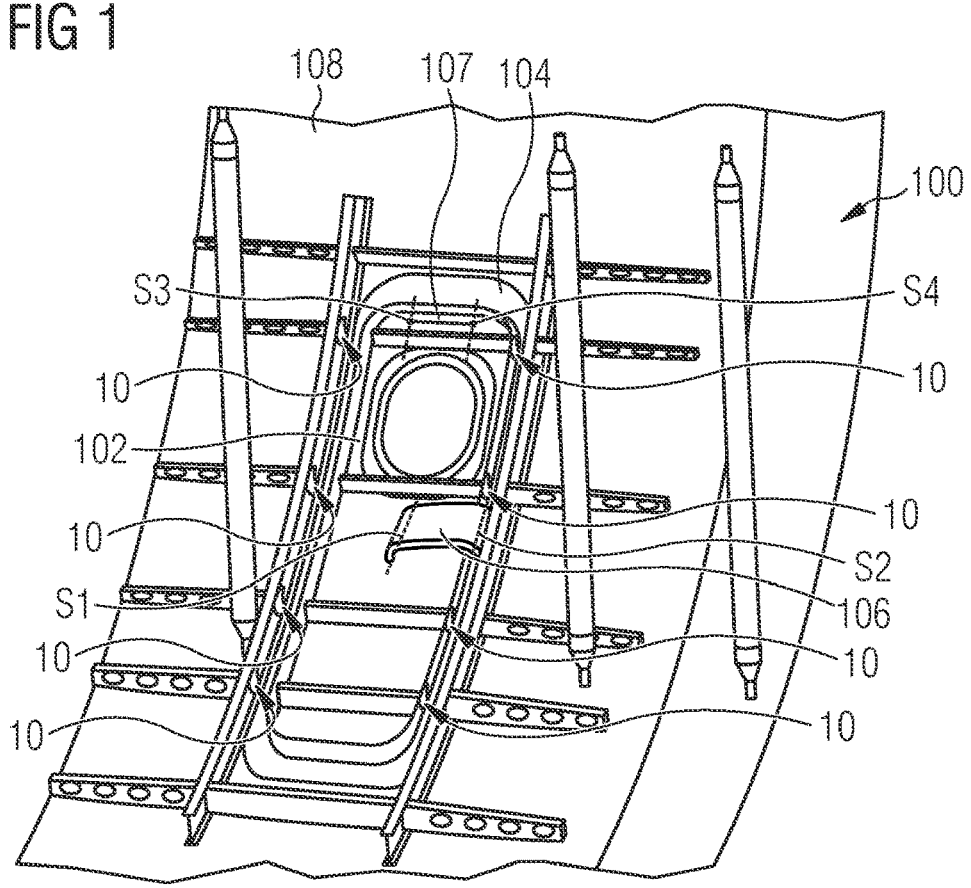
FIG. 1 shows a three-dimensional view of an aircraft door arrangement which is provided with a plurality of aircraft door locking systems.
Figure 2:
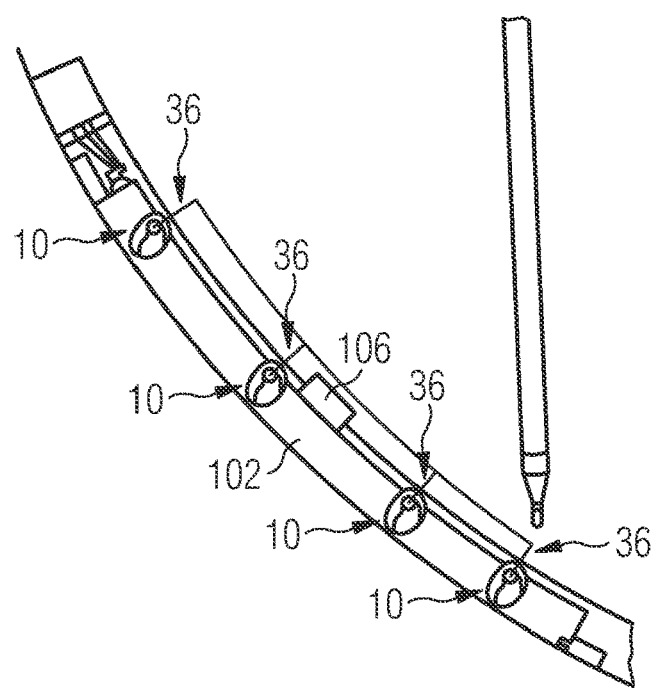
FIG. 2 shows a sectional view of the aircraft door arrangement according to FIG. 1.

FIGS. 1 and 2 each show an aircraft door arrangement 100. The aircraft door arrangement 100 comprises a first element 102 and a second element 104. The first element 102 is in the form of an aircraft door while the second element 104 is in the form of a doorframe suitable for receiving the aircraft door. Furthermore, the aircraft door arrangement 100 is provided with a plurality of aircraft door locking systems 10 which are arranged distributed along the two longitudinal edges of the doorframe and of the aircraft door. In the exemplary embodiment shown here of an aircraft door arrangement 100, eight aircraft door locking systems 10 are provided, but the number of aircraft door locking systems 10 may vary depending on requirements, for example depending on the dimensions of the aircraft door arrangement 100.

The aircraft door arrangement 100 illustrated in FIGS. 1 and 2 is installed in an aircraft passenger cabin which is located in a lower deck region of a commercial aircraft. The aircraft door arrangement 100 shown comprises a hinge arm 106 which permits pivoting of the aircraft door relative to the doorframe about pivot axes S1 and S2 and is guided by a guide rod 107 having pivot axes S3 and S4. As an alternative thereto, however, the aircraft door arrangement 100 can also have a different door opening mechanism, for example a mechanism in which the aircraft door during opening is first of all pushed outwards from the doorframe and is subsequently displaced substantially parallel to an aircraft outer skin 108 in order to open up a door opening defined by the doorframe.

Each of the aircraft door locking systems 10 comprises a first locking element 12 and a second locking element 14, see FIGS. 3 and 4 (only a roller 60 described in more detail below of the second locking element 14 is illustrated here). The first locking element 12 is fastened with the aid of a bearing element 15, see FIGS. 6 and 7, to the first element 102 of the aircraft door arrangement 100, the element being in the form of an aircraft door, while the second locking element 14 is fastened to the second element 104 of the aircraft door arrangement 100, the element being in the form of a doorframe.

Figure 6:
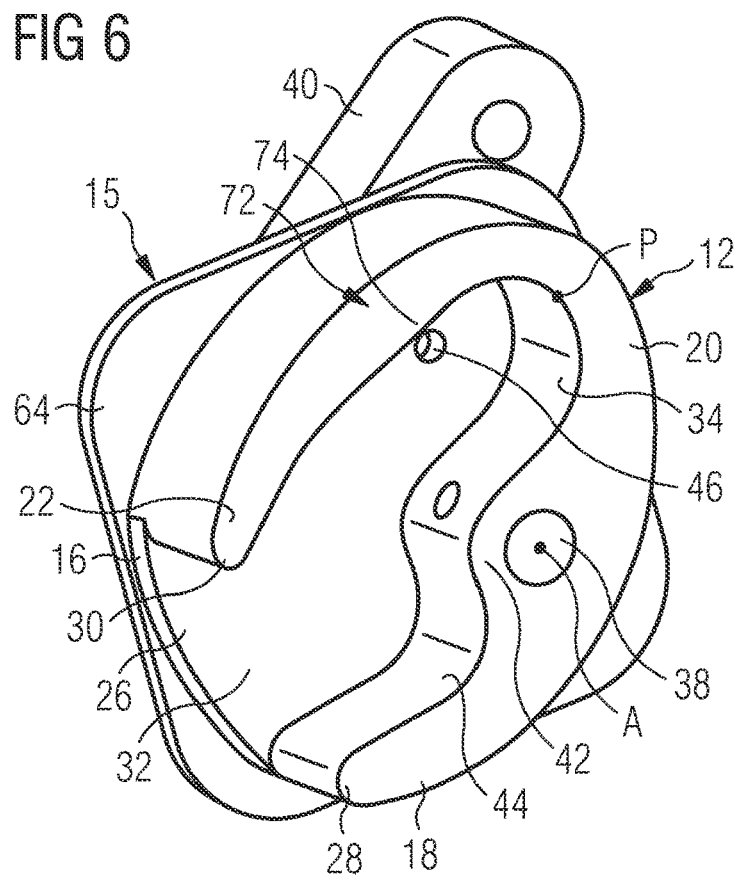
FIGS. 6 to 8 show three-dimensional detailed views of a first locking element of the aircraft door locking system according to FIGS. 3 and 4.
Figure 7:
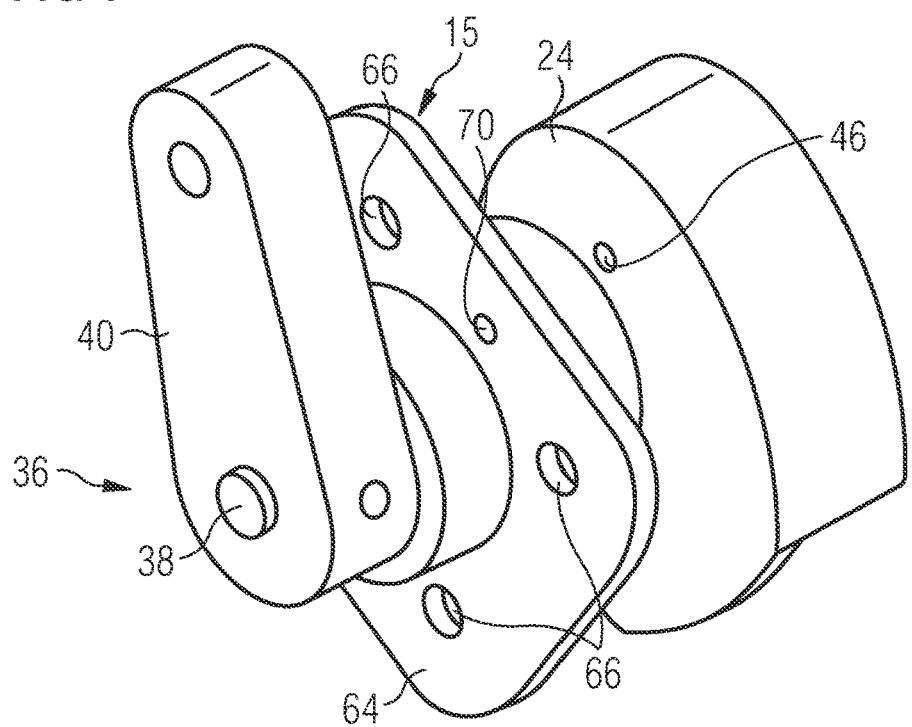
Figure 8:
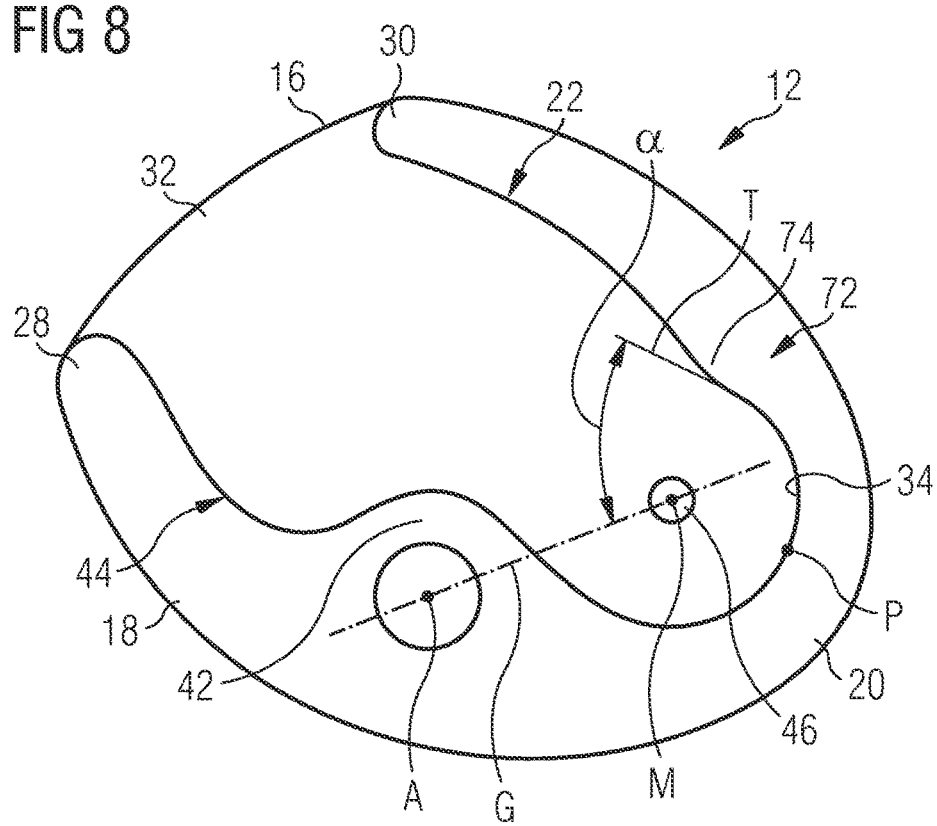

As can best be seen from FIGS. 6 to 8, the first locking element 12 comprises a baseplate 16, a first limb 18 and a second limb 22 which is connected to the first limb via a connecting piece 20. In the state of the aircraft door locking system 10 mounted in the aircraft door arrangement 100, a first surface 24 of the baseplate 16 faces the first element 102 of the aircraft door arrangement 100, the element being in the form here of an aircraft door, while a second surface 26 of the baseplate 16 facing away from the first element 102 of the aircraft door arrangement 100 carries the limbs 18, 22 and the connecting piece 20.

A receiving opening 32 is formed between a free end 28 of the first limb 18 and a free end 30 of the second limb 22. By contrast, the connecting piece 20 connecting the two limbs 18, 22 to each other defines a bearing shell 34. The shape of the bearing shell 34 is determined by the shape of an inner surface of the connecting piece 20 and is substantially in the form of a semi-circular arc, as viewed in a top view, in the exemplary embodiment shown here of an aircraft door locking system 10.

In the state mounted in the aircraft door arrangement 100, the first locking element 12 is attached to the first element 102 of the aircraft door arrangement 100 so as to be rotatable about a first axis of rotation A. A drive system 36 which serves to rotate the first locking element 12 about the first axis of rotation A comprises a rotary shaft 38 which extends coaxially with respect to the first axis of rotation A and on which the first locking element 12 is mounted for rotation therewith, see FIG. 7. Furthermore, the drive system 36 comprises a lever 40 which is likewise connected to the rotary shaft 38 for rotation therewith and is configured to transmit the driving force required for rotating the first locking element 12 about the first axis of rotation A to the rotary shaft 38.

The first axis of rotation A of the first locking element 12 is arranged in the region of a rounded axle projection 42 which is formed on the first limb 18 and projects in the direction of the second limb 22. Furthermore, a concavely curved bearing surface 44 is formed on an inner surface of the first limb 18, the inner surface facing the second limb 22, between the first axis of rotation A and the free end 28 of the first limb 18. Finally, the baseplate 16 of the first locking element 12 is provided with a first centering opening 46 which extends through the baseplate 16 parallel to the first axis of rotation. In particular, the first centering opening 46 is arranged in the region of a center point M of the semi-circular arc defined by the bearing shell 34.

Figure 9:
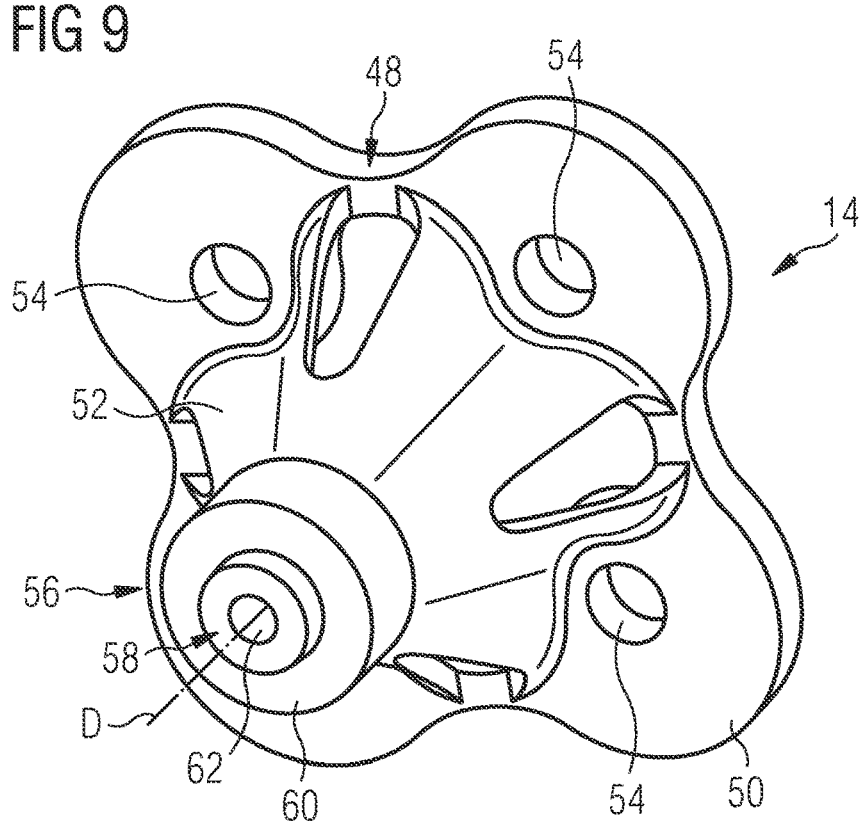
FIG. 9 shows a three-dimensional detailed view of a second locking element of the aircraft door locking system according to FIGS. 3 and 4.

The second locking element 14 which is illustrated in detail in FIG. 9 comprises a holding element 48 having a main plate 50 and a base 52. The main plate 50 is provided with fastening openings 54 for receiving fastening devices, such as, for example, screws, and serves to fix the second locking element 14 in a positionally fixed manner on the second element 104 of the aircraft door arrangement 100, the element being in the form of a doorframe. The base 52 is formed integrally with the main plate 50 and has a shape tapering from the main plate 50.

Furthermore, the second locking element 14 comprises a locking bolt 56 which comprises a core 58 which is connected to the holding element 48 and, in particular, is formed integrally with the holding element 48. The roller 60 is plugged onto the core 58 and is rotatable relative to the core 58 about a second axis of rotation D. In the state of the aircraft door locking system 10 mounted in the aircraft door arrangement 100, the first axis of rotation A of the first locking element 12 and the second axis of rotation D of the roller 60 are oriented parallel to each other. A second centering opening 62 extending coaxially with respect to the second axis of rotation D passes through the core 58 of the locking bolt 56.

The bearing element 15, which is shown in particular in FIG. 7, for fastening the first locking element 12 to the first element 102 of the aircraft door arrangement 100 comprises a bearing plate 64 which, similarly to the main plate 50 of the second locking element 14, is provided with fastening openings 66 for receiving fastening devices, such as, for example, screws. Furthermore, the bearing element 15 has a bearing base 68 which, in a state of the bearing element 15 connected to the first locking element 12, extends from the bearing plate 64 in the direction of the first locking element 12. The bearing element 15 is preferably provided with a third centering opening 70.

During the fastening of the first locking element 12 to the first element 102 of the aircraft door arrangement 100, the bearing element 15 is positioned relative to the first locking element 12 in such a manner that the third centering opening 70 formed in the bearing plate 64 of the bearing element 15 is aligned with the first centering opening 46 formed in the baseplate 16 of the first locking element 12. It can thereby be ensured that, in the state fixed to the first element 102 of the aircraft door arrangement 100, the bearing element 15 and the first locking element 12 are arranged in the desired position relative to each other.

Furthermore, the second locking element 14 is fastened to the second element 104 of the aircraft door arrangement 100 in such a position that the second centering opening 62 extending through the core 58 of the locking bolt 56 coaxially with respect to the second axis of rotation D is likewise aligned with the first centering opening 46 of the first locking element 12. It is thereby ensured that the two locking elements 12, 14 are positioned correctly relative to each other during the installation on the two elements 102, 104 of the aircraft door arrangement 100.

In a release state of the aircraft door locking system 10, the receiving opening 32 provided between the two limbs 18, 22 of the first locking element 12 faces the locking bolt 56. Accordingly, the locking bolt 56 can be inserted through the receiving opening 32 of the first locking element 12 by means of a translatory relative movement of the first and the second locking elements 12, 14 in a plane perpendicular to the first axis of rotation A of the first locking element 12. In the state of the aircraft door locking system 10 mounted in the aircraft door arrangement 100, the translatory relative movement of the two locking elements 12, 14 is brought about during a movement of the aircraft door from an open position into a closed position by the first locking element 12 converging with the second locking element 14 as a result of the aircraft door which is movable relative to the doorframe converging with the positionally fixed doorframe. After being inserted through the receiving opening 32, the locking bolt 56 of the second locking element 14 takes up the position shown in FIG. 3.

Figure 3:
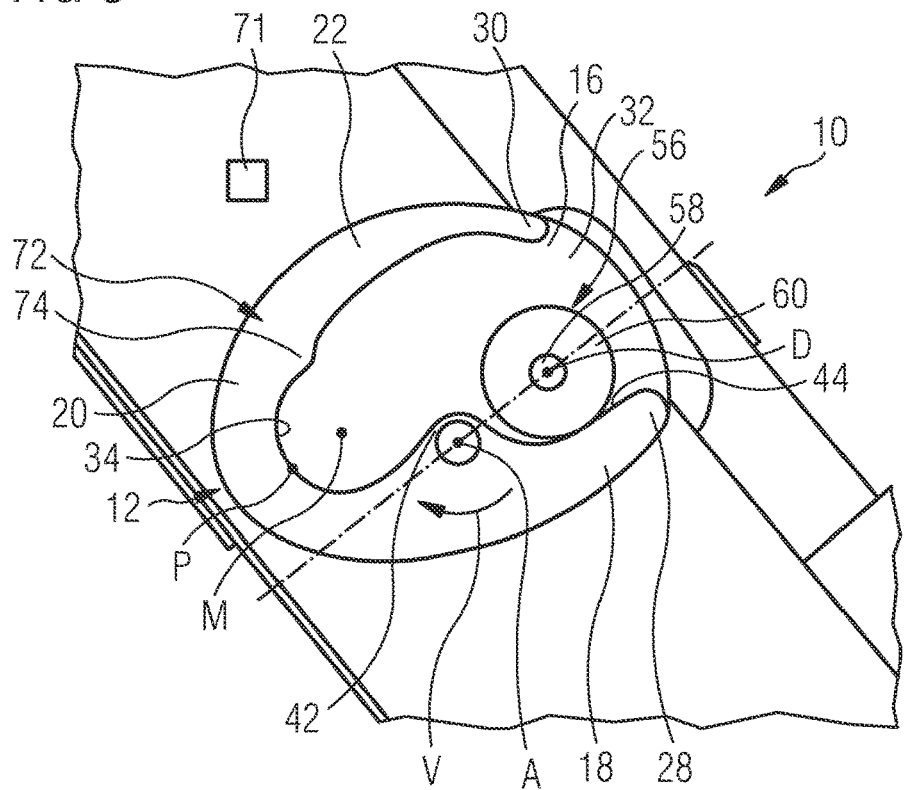
FIG. 3 shows an aircraft door locking system, which is illustrated in FIG. 1, in a release state.

Furthermore, the locking bolt 56 is positionable in the bearing shell 34 of the first locking element 12 by a rotation, which follows the insertion of the locking bolt 56 through the receiving opening 32, of the first locking element 12 about the first axis of rotation A in a locking direction V, see FIG. 3, in order to transfer the aircraft door locking system 10 into its locking state. If the aircraft door locking system 10 is in its locking state, the locking bolt 56 of the second locking element 14 takes up the position shown in FIG. 4. The interaction of the locking bolt 56, which is formed on the second locking element 14, with the bearing shell 34 of the first locking element 12, the bearing shell being adapted in respect of its shape to the shape of the locking bolt 56, then prevents a separation of the two locking elements 12, 14 and consequently of the two elements 102, 104 of the aircraft door arrangement 100, see arrows F1 and F1' in FIG. 4.

Figure 4:
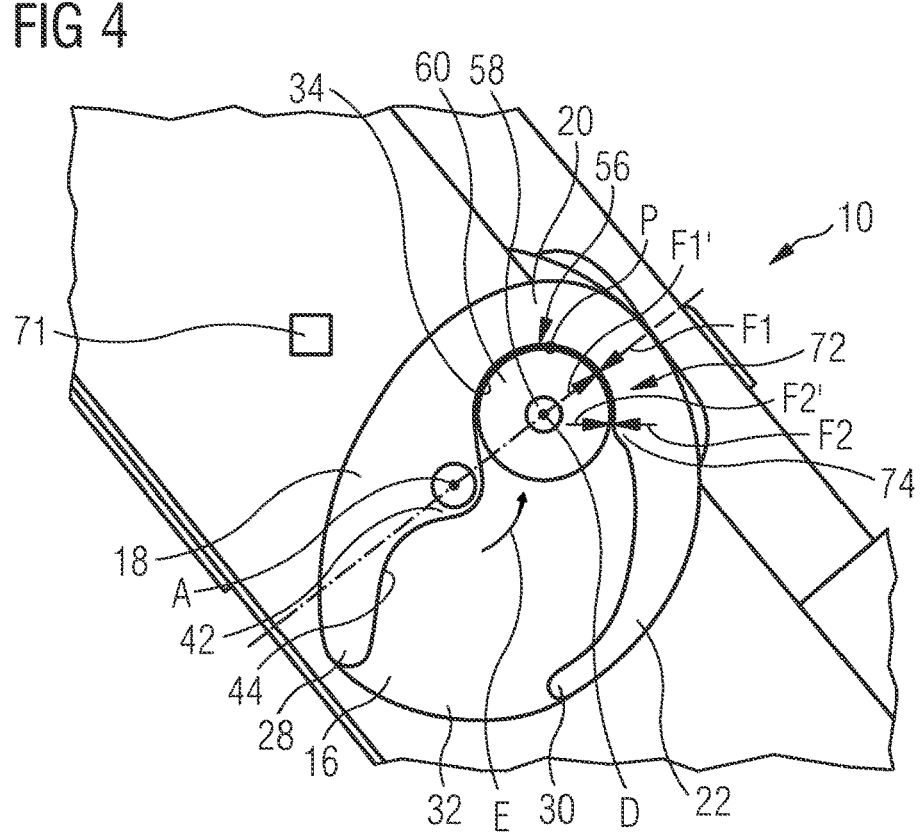
FIG. 4 shows the aircraft door locking system according to FIG. 3 in a locking state.

The transfer of the aircraft door locking system 10 from its locking state shown in FIG. 4 into its release state shown in FIG. 3 is illustrated in FIGS. 5a to 5f. In order to release the aircraft door locking system 10, the first locking element 12, driven by the drive system 36, is rotated about the first axis of rotation A in a release direction E relative to the first element 102 of the aircraft door arrangement 100 and relative to the second locking element 14. In the process, the locking bolt 56 of the second locking element 14 slides along an inner surface of the second limb 22 of the first locking element 12, see FIGS. 5b to 5d, wherein the sliding movement of the locking bolt 56 is facilitated by a rotation of the roller 60 of the locking bolt 56 about the second axis of rotation D.

Figure 5E:
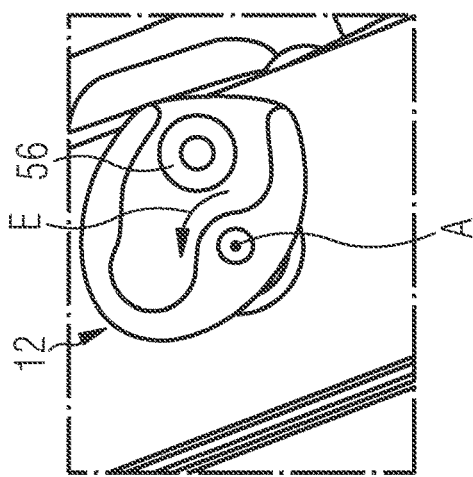
FIGS. 5a to 5f illustrate the transfer of the aircraft door locking system according to FIGS. 3 and 4 from its locking state into its release state.
Figure 5F:
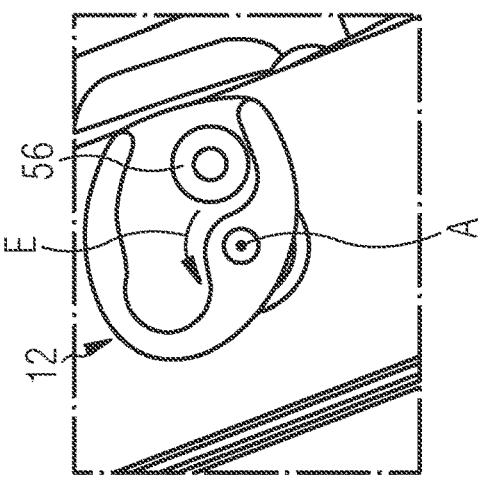
Figure 5C:
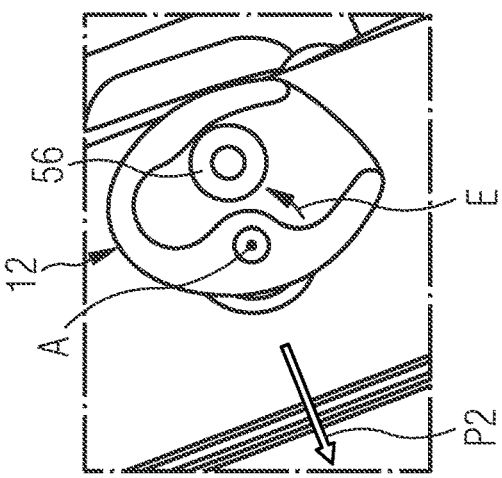
Figure 5D:
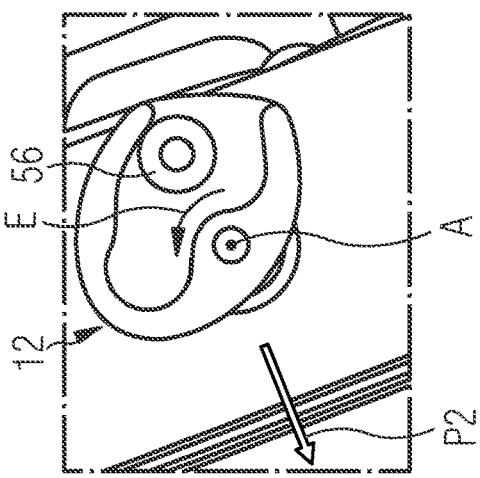
Figure 5A:
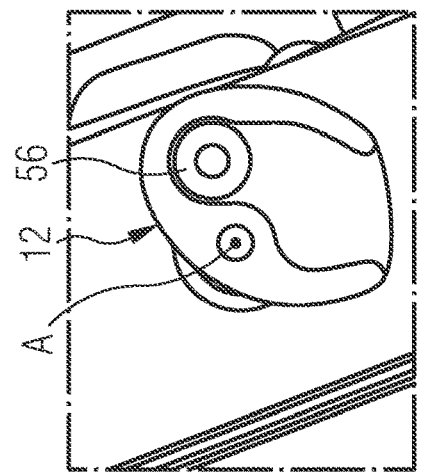
Figure 5B:
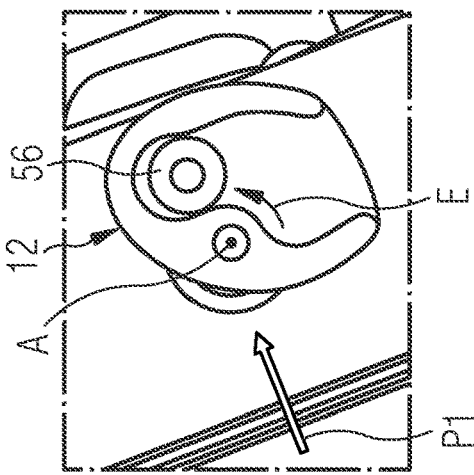

By means of the interaction of the locking bolt 56 with the inner surface of the second limb 22 of the first locking element 12, the aircraft door is first of all pulled inwards relative to the doorframe, see arrow P1 in FIG. 5b, and is subsequently pressed outwards relative to the doorframe, see arrow P2 in FIGS. 5c and 5d. In the final part of the rotational movement of the first locking element 12 about the first axis of rotation A, the locking bolt 56 is released from the inner surface of the second limb 22 of the first locking element 12, see FIGS. 5e and 5f, until it finally again takes up the end position shown in FIG. 3.

In the end position shown in FIG. 3, the locking bolt 56 is received in the concavely curved bearing surface 44 formed on the first limb 18 of the first locking element 12. Since the bearing surface 44 is adapted in respect of its shape to the shape of the locking bolt 56, the locking bolt 56 is received securely in the bearing surface 44 in the release state of the aircraft door locking system 10. The aircraft door and the doorframe of the aircraft door arrangement 100 then take up an extreme position in which the aircraft door is arranged lying maximally on the inside relative to the doorframe. The receiving of the locking bolt 56 in the bearing surface 44 prevents the two elements 102, 104 of the aircraft door arrangement 100 from moving beyond the defined extreme position. As a result, overloading of the components of the aircraft door arrangement 100 and in particular of the door seals is prevented.

The aircraft door locking system 10 is provided with a sensor arrangement 71 for sensing an operating state of the aircraft door locking system 10. The sensor arrangement 71 senses a position of the first locking element 12 relative to the first element 102 of the aircraft door arrangement 100 and transmits corresponding sensor signals to a control unit (not shown in the figures). The control unit can then determine with reference to the sensor signals whether the aircraft door locking system 10 is locked or released. Furthermore, the control unit is connected to a display device which displays the operating state of the aircraft door locking system 10 and is arranged, for example, in the cockpit of an aircraft provided with the aircraft door locking system 10.

Finally, the aircraft door locking system 10 comprises a torque-generating device 72 which is configured so as, in the locking state of the aircraft door locking system 10, to generate a torque which opposes a rotation of the first locking element 12 about the first axis of rotation A in the direction of the release direction E if a force directed substantially perpendicular to the first axis of rotation A is exerted on the bearing shell 34 of the first locking element 12 and/or on the locking bolt 56 of the second locking element 14, see by way of example arrows F2, F2' in FIG. 4.

The torque-generating device 72 comprises a locking projection 74 which is formed on the second limb 22 of the first locking element 12 and projects in the direction of the first limb 18 of the first locking element 12. The locking projection 74 interacts with the locking bolt 56 of the second locking element 14 if a force directed substantially perpendicular to the first axis of rotation A is exerted on the bearing shell 34 and/or on the locking bolt 56. The interaction of the locking projection 74 with the locking bolt 56 results in the generation of the torque of the torque-generating device 72, the torque opposing a rotation of the first locking element 12 in the release direction E.

The locking projection 74 is arranged closer to an apex point P of the connecting piece 20 of the first locking element 12 than the first axis of rotation A. The torque of the torque-generating device 72, the torque opposing a rotation of the first locking element 12 in the release direction E, is determined by an angle α which is defined by a tangent T which lies on a region of the locking projection 74 facing the apex point P of the connecting piece 20, and by a straight line G which runs perpendicular to the first axis of rotation A through the center point M of the circular arc segment defined by the bearing shell 34. In the exemplary embodiment shown in the figures of an aircraft door locking system 10, the angle α is approx. 30°. Furthermore, the closing movement applied by the torque-generating device 72 is determined by the clamping force of the door seal and the amount of force exerted on the bearing shell 34 and/or on the locking bolt 56.

The force which is exerted on the bearing shell 34 of the first locking element 12 and/or on the locking bolt 56 of the second locking element 14 and which induces the closing moment of the torque-generating device 72, the closing moment opposing a release of the aircraft door locking system 10, can result, for example, from a pressure difference which prevails between an ambient pressure and an internal pressure, which is increased in comparison to the ambient pressure, in a pressurized aircraft cabin in the flight mode of an aircraft provided with the aircraft door locking system 10. However, the torque-generating device 72 also then generates a torque which opposes a rotation of the first locking element 12 about the first axis of rotation A in the release direction E if a (manual) compressive force is exerted on an aircraft door (for example a force exerted by a door seal). Finally, the torque-generating device 72 also generates a closing moment if an increased external pressure acts on the aircraft door, for example in the event of an emergency landing of an aircraft provided with the aircraft door locking system 10 on water.

In the case of the aircraft door arrangement 100 provided with a plurality of aircraft door locking systems 10, the drive systems 36 of the aircraft door locking systems 10 are coupled to one another in such a manner that only some of the aircraft door locking systems 10 are driven directly while some of the other aircraft door locking systems 10 are driven indirectly. In the exemplary embodiment shown in FIG. 2, only the aircraft door locking systems 10 which are arranged "lying on the inside" and are flanked by in each case two adjacent aircraft door locking systems 10 are driven directly whereas the aircraft door locking systems 10 arranged "lying on the outside" are driven indirectly, i.e., via the directly driven aircraft door locking systems 10. Furthermore, in the case of the aircraft door arrangement 100, only the indirectly driven aircraft door locking systems 10 are provided with a sensor arrangement 71 rather than all of the aircraft door locking systems 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door locking system, comprising:
   a first locking element which is fastenable to a first element of an aircraft door arrangement to be rotatable about a first axis of rotation and has a receiving opening and a bearing shell,
   a second locking element which is fastenable to a second element of the aircraft door arrangement and comprises a locking bolt,
   wherein, in a release state of the aircraft door locking system, the locking bolt of the second locking element is insertable through the receiving opening of the first locking element by means of a translatory relative movement of the first and the second locking elements in a plane perpendicular to the first axis of rotation of the first locking element and, by a subsequent rotation of the first locking element about the first axis of rotation in a locking direction, is positionable in the bearing shell of the first locking element in order to transfer the aircraft door locking system into its locking state, and
   a torque-generating device which is configured in order, in the locking state of the aircraft door locking system, to generate a torque which opposes a rotation of the first locking element about the first axis of rotation in a direction of a release direction opposite to the locking direction if a force directed perpendicular to the first axis of rotation is exerted on at least one of the bearing shell of the first locking element or on the locking bolt.

2. The aircraft door locking system according to claim 1, wherein the first locking element comprises a first limb and a second limb which is connected to the first limb via a connecting piece, wherein the receiving opening of the first locking element is formed between a free end of the first limb and a free end of the second limb.

3. The aircraft door locking system according to claim 2, wherein the bearing shell of the first locking element is defined by the connecting piece.

4. The aircraft door locking system according to claim 2, wherein the first axis of rotation of the first locking element is arranged in a region of the first limb of the first locking element in the region of an axle projection of the first limb, said axle projection projecting in a direction of the second limb.

5. The aircraft door locking system according to claim 2, wherein a concavely curved bearing surface is formed on the first limb between the first axis of rotation and the free end of the first limb, said bearing surface being configured to receive the locking bolt of the second locking element if, in a state of the door locking system mounted in the aircraft door arrangement, the first and the second element of the aircraft door arrangement take up a defined extreme position.

6. The aircraft door locking system according to claim 1, wherein the first locking element furthermore comprises a baseplate which is provided with a first centering opening extending through the baseplate parallel to the first axis of rotation.

7. The aircraft door locking system according to claim 2, wherein the torque-generating device comprises a locking projection which is formed on the second limb of the first locking element, projects in a direction of the first limb of the first locking element and is configured to interact with the locking bolt of the second locking element if the force directed perpendicular to the first axis of rotation is exerted on at least one of the bearing shell of the first locking element or on the locking bolt of the second locking element.

8. The aircraft door locking system according to claim 7, wherein the locking projection is arranged closer to an apex point of the connecting piece of the first locking element than the first axis of rotation.

9. The aircraft door locking system according to claim 7, wherein the torque of the torque-generating device, said torque opposing the rotation of the first locking element in the release direction, is determined by an angle which is defined by a tangent which lies on a region of the locking projection facing an apex point of the connecting piece, and by a straight line which runs perpendicular to the first axis of rotation through a center point of a circular arc segment defined by the bearing shell.

10. The aircraft door locking system according to claim 1, wherein the locking bolt of the second locking element comprises a core connected to a holding element and a roller which is plugged onto the core and is rotatable relative to the core about a second axis of rotation, wherein a second centering opening extending through the core coaxially with respect to the second axis of rotation is formed in the core.

11. The aircraft door locking system according to claim 1, which furthermore comprises a bearing element which is connectable to the first locking element, wherein the bearing element is provided with a third centering opening which, when the aircraft door locking system is installed on the aircraft door arrangement, is positionable relative to the first locking element in such a manner that said third centering opening is aligned with a first centering opening formed in a baseplate of the first locking element.

12. The aircraft door locking system according to claim 1, which furthermore comprises a sensor arrangement for sensing an operating state of the aircraft door locking system, wherein the sensor arrangement is configured to sense a position of the first locking element relative to the first element of the aircraft door arrangement.

13. The aircraft door locking system according to claim 1, furthermore comprising a drive system which is configured to rotate the first locking element about the first axis of rotation in order to adjust the aircraft door locking system between the release state and the locking state, wherein the drive system comprises a rotary shaft which extends coaxially with respect to the first axis of rotation and on which the first locking element is mounted for rotation therewith.

14. An aircraft door arrangement, comprising:
a first element,
a second element, and
at least one aircraft door locking system according to claim 1,
wherein the first locking element of the aircraft door locking system is fastened to the first element, and the second locking element of the aircraft door locking system is fastened to the second element.

15. The aircraft door arrangement according to claim 14, wherein the first element is in a form of an aircraft door and the second element is in a form of a doorframe.

16. The aircraft door arrangement according to claim 14, further comprising a plurality of said aircraft door locking systems, which are arranged distributed along two mutually opposite side edges of the first and the second element.

17. The aircraft door arrangement according to claim 16, furthermore comprising:
each of the plurality of door locking systems comprising a drive system which is configured to rotate the first locking element about the first axis of rotation to adjust the aircraft door locking system between the release state and the locking state,
wherein the drive system comprises a rotary shaft which extends coaxially with respect to the first axis of rotation and on which the first locking element is mounted for rotation therewith, and
wherein the drive systems of the aircraft door locking systems are coupled to one another in such a manner that only some of the aircraft door locking systems are driven directly while other aircraft door locking systems are driven indirectly.

18. The aircraft door arrangement according to claim 16, wherein only some of the aircraft door locking systems are provided with a sensor arrangement.

* * * * *